United States Patent
Zandsteeg et al.

(10) Patent No.: US 11,419,082 B2
(45) Date of Patent: Aug. 16, 2022

(54) METHOD FOR DEVICE SYNCHRONIZATION

(71) Applicant: KONINKLIJKE PHILIPS N.V., Eindhoven (NL)

(72) Inventors: Cornelis Johannes Zandsteeg, Usselmuiden (NL); Lolke Klaas Salverda, Beetsterzwaag (NL); Andries Holtrop, Hoornsterzwaag (NL); Senad Sabljic, Emmen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/285,944

(22) PCT Filed: Nov. 29, 2019

(86) PCT No.: PCT/EP2019/083166
§ 371 (c)(1),
(2) Date: Apr. 16, 2021

(87) PCT Pub. No.: WO2020/114917
PCT Pub. Date: Jun. 11, 2020

(65) Prior Publication Data
US 2021/0385772 A1    Dec. 9, 2021

(30) Foreign Application Priority Data
Dec. 5, 2018    (EP) .................................... 18210496

(51) Int. Cl.
*H04W 56/00*    (2009.01)
*H04B 5/00*    (2006.01)

(52) U.S. Cl.
CPC ...... *H04W 56/0015* (2013.01); *H04B 5/0081* (2013.01); *H04W 56/0035* (2013.01)

(58) Field of Classification Search
None
See application file for complete search history.

(56) References Cited

U.S. PATENT DOCUMENTS

| | | | |
|---|---|---|---|
| 9,939,546 | B2 | 4/2018 | Tsunasaki |
| 2003/0184285 | A1 | 10/2003 | Anderson |

(Continued)

FOREIGN PATENT DOCUMENTS

| | | |
|---|---|---|
| EP | 2725380 | 4/2014 |
| JP | 2007255986 | 10/2007 |
| WO | 2017220689 | 12/2017 |

OTHER PUBLICATIONS

International Search Report and Written Opinion dated Dec. 20, 2019 for International Application No. PCT/EP2019/083166 Filed Nov. 29, 2019.

(Continued)

*Primary Examiner* — Marcus Smith (57) ABSTRACT

A method for synchronizing a first device and a second device, the first device and the second device being connectable via a wireless link. The method comprises generating (202), at the first device, a synchronization signal comprising a sequence of signals, wherein each of the signals in the sequence has a first frequency; transmitting (204) the sequence of signals from the first device to the second device; performing (206), at the second device, signal processing of the sequence of signals to determine relative phase information of each of the signals in the sequence; and synchronizing (208), based on the determined relative phase information, the first device and the second device by correcting phase offset of subsequent individual signals transmitted from the first device to the second device.

13 Claims, 5 Drawing Sheets

(56) References Cited

U.S. PATENT DOCUMENTS

| | | |
|---|---|---|
| 2008/0319349 A1 | 12/2008 | Zilberman |
| 2014/0155098 A1* | 6/2014 | Markham ............ H04B 1/0064 |
| | | 455/456.3 |
| 2014/0200734 A1 | 7/2014 | Krenik |
| 2014/0266213 A1 | 9/2014 | Olsson |
| 2016/0064994 A1* | 3/2016 | Ku ......................... H02J 7/025 |
| | | 307/104 |
| 2016/0233728 A1* | 8/2016 | Park ....................... H02J 7/025 |
| 2016/0380488 A1 | 12/2016 | Widmer |
| 2018/0287669 A1* | 10/2018 | Nakano .................. H04B 5/02 |

OTHER PUBLICATIONS

Written Opinion of the International Preliminary Examining Authority dated Mar. 16, 2020 for International Application No. PCT/EP2019/083166 Filed Nov. 29, 2019.

International Preliminary Report on Patentability dated Aug. 19, 2020 for International Application No. PCT/EP2019/083166 Filed Nov. 29, 2019.

* cited by examiner

METHOD FOR DEVICE SYNCHRONIZATION

CROSS REFERENCE TO RELATED APPLICATIONS

This application is the U.S. National Phase application under 35 U.S.C. § 371 of International Application No. PCT/EP2019/083166 filed Nov. 29, 2019, which claims the benefit of European Patent Application Number 18210496.8 filed Dec. 5, 2018. These applications are hereby incorporated by reference herein.

FIELD OF THE INVENTION

The present disclosure relates to a method for synchronizing a first device and a second device. The present disclosure also relates to a system comprising a first device and a second device, the devices being connectable via a wireless link and configured to perform automatic synchronization.

BACKGROUND OF THE INVENTION

Automatic hair clipping systems (also known as Smart Clipper systems) involve the use of a position measurement system, a hair clipper with motorized length settings, a digital representation of a hair style indicating a length of hair at each position with respect to a subject's head, and a digital user interface which allows a user to select, create, and transfer a hairstyle to the hair clipper. Typical positioning measurement systems used in this particular field involve three-dimensional (3D) positioning and 3D orientation based on alternating current (AC) magnetic fields, which is also known as electromagnetic field (EMF). These systems are capable of performing position measurements without having the object in view or contacting the object. Nevertheless, they require proper calibration and set up in order to provide the correct measurement data.

SUMMARY OF THE INVENTION

In an automatic hair clipping system, there is usually provided an EMF transmitter that is located at the hair clipper, and an EMF sensor that is located or connected to a separate unit (e.g. a "control box" which includes a processor capable of receiving and processing EMF signals). The hair clipper and the control box are both wireless components and in communication with each other via a wireless link. In order to achieve accurate position measurements in the field of EMF tracking, the algorithm used for computing the position of the sensor(s) with respect to the signals transmitted from the EMF transmitter(s) needs to obtain relevant magnitude and phase information of the received signals with respect to the transmitted signals. For systems in which the transmitters and sensors are both connected to the same processing unit, this phase information is readily available. However, in automatic hair clipping systems where both the hair clipper and the control box are wireless devices, the sensor and the transmitter are located at separate wireless components and each wirelessly connected to a separate processing unit, the phase information is not available in a default setting.

In some cases, the initial phase information can be obtained via a calibration operation in which a user is asked to hold the hair clipper at a known position and orientation with respect to the sensor. For this known position the phase information of the signals is known, and the measured phase can be corrected if necessary. However, if the user performs calibration of the system while holding the hair clipper at a wrong position and/or orientation, this may result in incorrect or inaccurate measurement data.

As noted above, there are a number of disadvantages associated with currently known techniques for calibrating and/or synchronizing wireless devices in a system. For example, typically a user is required to place one of the devices at a prescribed known position so as to enable calibration of relative positions of the devices. Some other currently known techniques may require additional hardware components for performing clock synchronization which leads to an increase in manufacturing costs. It would therefore be advantageous to provide an improved method for automatically synchronizing a first device and a second device that does not require user interaction with the system or additional hardware components. It would also be advantageous to provide a reliable method for the synchronization that is less error-prone and does not require complex switching between analog and digital domains.

To better address one or more of the concerns mentioned earlier, in a first aspect, a method for synchronizing a first device and a second device is provided, the first device and the second device being connectable via a wireless link. The method comprises: generating, at the first device, a synchronization signal comprising a sequence of signals, wherein each of the signals in the sequence has a first frequency; transmitting the sequence of signals from the first device to the second device; performing, at the second device, signal processing of the sequence of signals to determine relative phase information of each of the signals in the sequence; and synchronizing, based on the determined relative phase information, the first device and the second device by correcting phase offset of subsequent individual signals transmitted from the first device to the second device.

In some embodiments, the first device may comprise a first transmitter coil, a second transmitter coil, and a third transmitter coil. In these embodiments, transmitting the sequence of signals may comprise: transmitting, from the first transmitter coil, the synchronization signal to the second device as a first signal in the sequence; transmitting, from the second transmitter coil, the synchronization signal to the second device as a second signal in the sequence; and transmitting, from the third transmitter coil, the synchronization signal to the second device as a third signal in the sequence.

In some embodiments, the method may further comprise changing from a synchronization mode in which signal processing of the sequence of signals is performed to a normal mode in which one or more subsequent individual signals are transmitted from the first device to the second device. In these embodiments, the method may further comprise comparing, in the normal mode, a signal strength of the at least one subsequent individual signals with a predetermined threshold, and changing from the normal mode to the synchronization mode if the signal strength of at least one of the subsequent individual signals is lower than the predetermined threshold.

In some embodiments, the method may further comprise: transmitting, in the normal mode, a position signal from each of the first transmitter coil, the second transmitter coil, and the third transmitter coil. The respective position signals from each of the transmitter coils may have different frequencies, and synchronizing the first device and the second device may comprise correcting, at the second device, phase offset of each of the transmitted position signals may be based on the determined relative phase information. Also, the method may further comprise determining, at the second device, a position of the first device relative to the second device based on at least one of the transmitted position signals with corrected phase offsets. In addition, correcting phase offset of each of the transmitted position signals may comprise determining the phase offset as one of 0° and −180° based on the determined relative phase information.

In some embodiments, the first device may further comprise a functional component located at a predetermined distance from the first to third transmitter coils. In these embodiments, determining a position of the first device relative to the second device may further comprise: performing signal processing of the position signals to obtain a first position and a second position, wherein one of the first position and the second position corresponds to a hemisphere in which the functional component is located with respect to the first to third transmitter coils; determining which of the first position and the second position corresponds to the hemisphere in which the functional component is located based on the predetermined distance between the functional component and the first to third transmitter coils; and selecting the position that corresponds to the hemisphere in which the functional component is located as the correct position of the first device relative to the second device.

In some embodiments, performing signal processing of the sequence of signals may comprise: generating a reference signal at the second device; selecting one of the first transmitter coil, the second transmitter coil, and the third transmitter coil of the first device; determining a phase offset associated with the selected transmitter coil based on the signal in the sequence transmitted by the selected transmitter coil and the generated reference signal; and determining, for each of the two other transmitter coils, a phase offset associated with the transmitter coil, wherein determination of the phase offset is based on: the determined phase offset associated with the selected transmitter coil and a phase shift between the signal transmitted from the respective transmitter coil in the sequence and the generated reference signal. Furthermore, synchronizing the first device and the second device may comprise synchronizing the phase difference between the first device and the second device based on the determined phase offsets associated with the first to third transmitted coils.

In some embodiments, the selected transmitter coil may be the first transmitter coil, and determining the phase offset for the second transmitter coil may be performed before determining the phase offset for the third transmitter coil.

In some embodiments, the second device may comprise a first receiver coil, a second receiver coil, and a third receiver coil, each of the first to third receiver coils being configured to receive each of the signals in the sequence transmitted from the first device. In these embodiments, determining a phase offset associated with a respective transmitter coil may comprise: determining the signal strength of the respective transmitted signal received at each the first receiver coil, the second receiver coil, and the third receiver coil; selecting one of the first receiver coil, the second receiver coil, and the third receiver coil which corresponds the largest received signal strength; and determining the phase offset associated with the respective transmitter coil based on the respective transmitter signal received at the selected receiver coil.

In some embodiments, the method may further comprise transmitting a notification from the second device to the first device upon receiving each of the first signal, the second signal, and the third signal.

In some embodiments, the method may further comprise comparing a signal strength of at least one of the signals in the sequence with a predetermined threshold. In these embodiments, the step of synchronizing the first device and the second device may only be performed if the signal strength of at least one of the signals in the sequence is higher than the predetermined threshold.

In a second aspect, there is provided a system comprising a first device and a second device. The first device and the second device are connectable via a wireless link. The first device comprises a first control unit configured to: generate a synchronization signal comprising a sequence of signals, wherein each of the signals in the sequence has a first frequency; and transmit the sequence of signals to the second device. The second device comprises a second control unit configured to: perform signal processing of the sequence of signals to determine relative phase information of each of the signals in the sequence; and synchronize, based on the determined relative phase information, the first device and the second device by correcting phase offset of subsequent individual signals transmitted from the first device.

In some embodiments, the second device may comprise a first receiver coil, a second receiver coil, and a third receiver coil, and wherein each of the first to third receiver coils is configured to receive each of the signals in the sequence transmitted from the first device.

In some embodiments, the first device may be a personal care device and the second device may be a sensor device. The sensor device may be configured to be placed at a predetermined location with respect to a user.

According to the aspects and embodiments described above, the limitations of existing techniques are addressed. In particular, the above-described aspects and embodiments enable a first device and a second device connectable via a wireless link in a system to be synchronized automatically by communicating relative phase information through the wireless link without requiring any user input or operation. There is thus provided an improved method for synchronizing a first device and a second device.

These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF THE EMBODIMENTS

As noted above, there is provided an improved method for synchronizing a first device and a second device and a corresponding system which address the existing problems.

Figure 1:
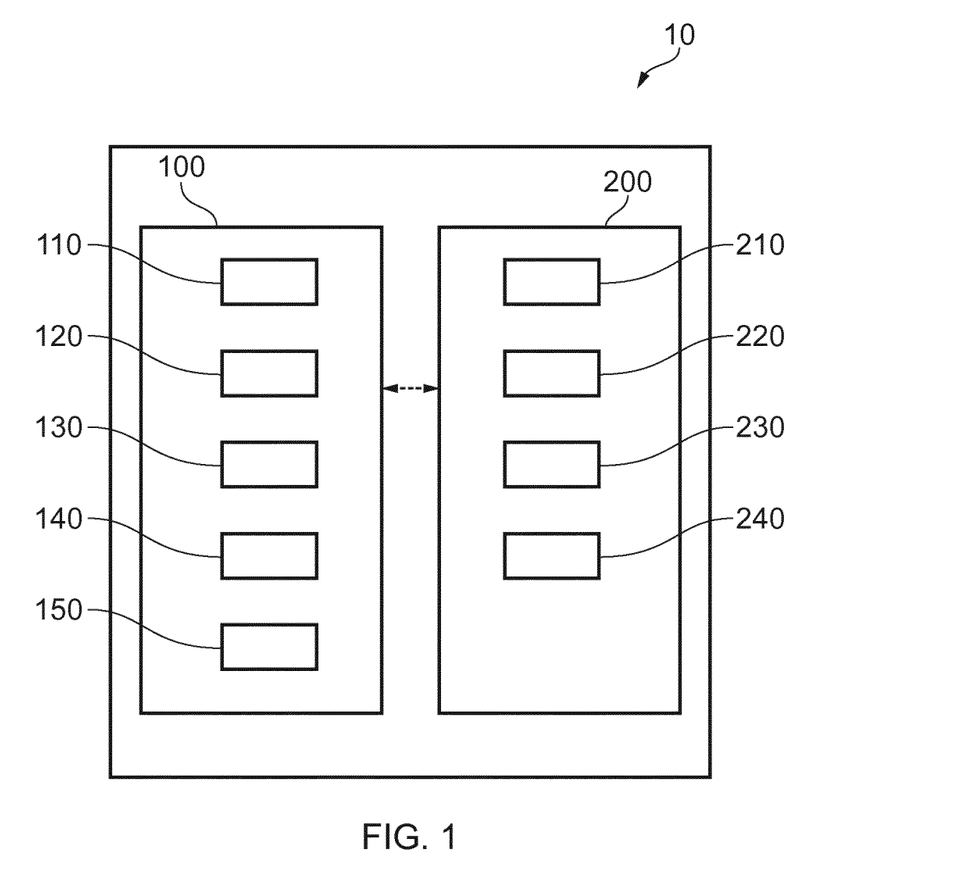
FIG. 1 is a block diagram of a system comprising a first device and a second device according to an embodiment.

FIG. 1 shows a block diagram of a system 10 comprising a first device 100 and a second device 200 according to an embodiment. The system 10 may be a positioning and/or tracking system, for example in the field of wireless personal care devices (e.g. a Smart Clipper). The first device 100 in this case may be a personal care device and the second device 200 may be a sensor device that is configured to be placed at a predetermined location with respect to a user. For example, the second device 200 may be a sensor frame that is designed to be worn near or on a face of a user. The first device 100 and the second device 200 are configured to be connectable via a wireless link, as represented by the dotted double-headed arrow in the diagram. The wireless link may be established by radio frequency communication.

The first device 100 is configured to generate a synchronization signal comprising a sequence of signals, each of the signals in the sequence having a first frequency. The first device 100 is further configured to transmit the sequence of signals to the second device 200. As illustrated in FIG. 1, the first device 100 in this embodiment comprises a first transmitter coil 110, a second transmitter coil 120, a third transmitter coil 130, a first control unit 140, and a functional component 150. Therefore, in this embodiment, the generated synchronization signal can be transmitted by each of the first transmitter coil 110, the second transmitter coil 120, and the third transmitter coil 130. The synchronization signal as transmitted by each of the first to third transmitter coils may be regarded as respective signals in the sequence. The transmission of signals by the plurality of transmitter coils may be controlled by the first control unit 140 at the first device 100.

In some embodiments, the signal(s) transmitted by each of the first transmitter coil 110, the second transmitter coil 120, and the third transmitter coil 130 may correspond to a respective axis in a three-dimensional Cartesian coordinate system. In more detail, the signal(s) transmitted by the first transmitter coil 110 may correspond to the x-axis, the signal(s) transmitted by the second transmitter coil 120 may correspond to the y-axis, and the signal(s) transmitted by the third transmitter coil 130 may correspond to the z-axis.

Figure 5A:
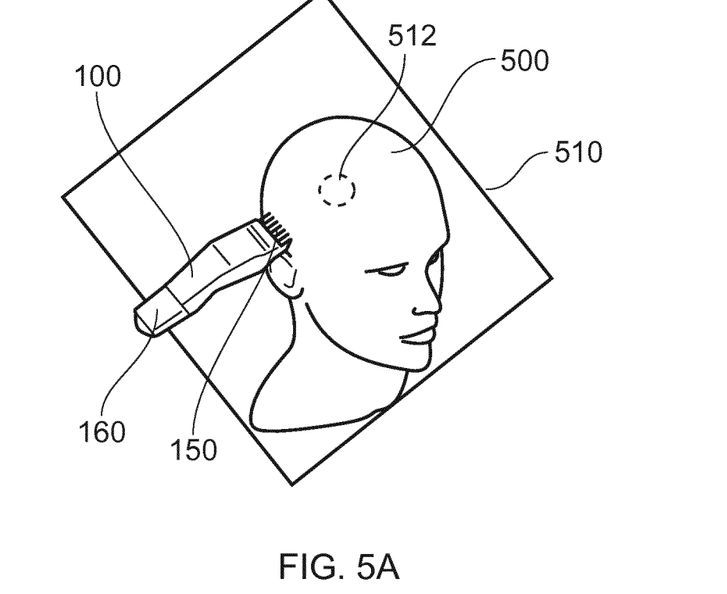
FIG. 5A and FIG. 5B respectively illustrate a relevant hemisphere in which the functional component is located with respect to the transmitter coils of the first device of FIG. 1 and an irrelevant hemisphere.
Figure 5B:
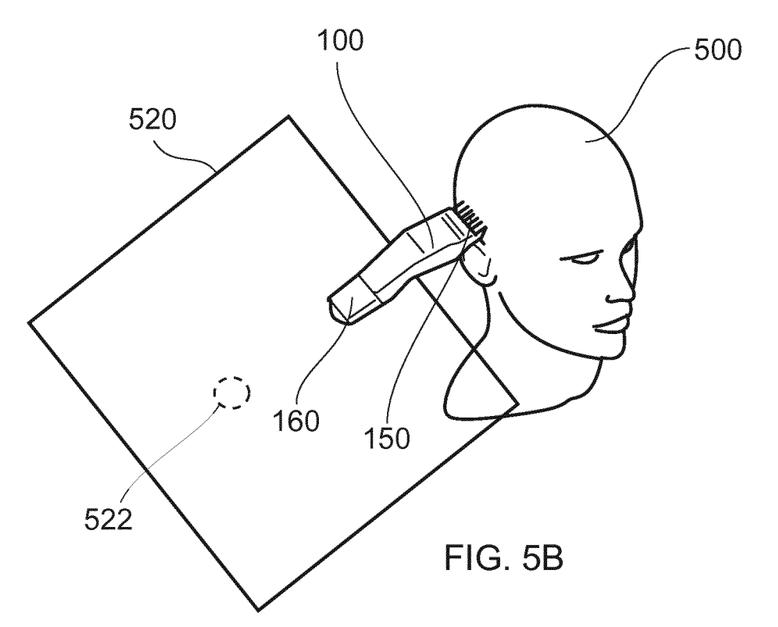

The functional component 150 is a component at the first device 100, the function component 150 being configured to perform a specific function of the first device 100. For example, as mentioned above, in some embodiments the first device 100 may be a personal care device such as a hair clipper. In this example, the functional component 150 of the first device 100 may be a cutting unit. In some embodiments, the functional component 150 may be located at a predetermined distance from the first transmitter coil 110, the second transmitter coil 120, and the third transmitter coil 130. An example of this arrangement is shown in FIG. 5A and FIG. 5B.

The second device 200 is configured to perform signal processing of the sequence of signals transmitted from the first device 100 to determine relative phase information of each of the signals in the sequence. The second device 200 is further configured to synchronize, based on the determined relative phase information, the first device 100 and the second device 200 by correcting phase offset of subsequent individual signals transmitted from the first device 100. As shown in FIG. 1, the second device 200 in the present embodiment comprises a first receiver coil 210, a second receiver coil 220, a third receiver coil 230, and a second control unit 240. In this embodiment, each of the first receiver coil 210, the second receiver coil 220, and the third receiver coil 230 is configured to receive each of the signals in the sequence transmitted from the first device 100. This will be explained in more detail with reference to FIG. 3 and FIG. 4 which illustrate the transmission of signals between the first device 100 and the second device 200.

The first control unit 140 and/or the second control unit 240 may be implemented in numerous ways, with software and/or hardware, to perform the various functions described herein. For example, the control unit may be implemented as a component of an external device, e.g. a smart phone or a smart device, or as program code. The control unit may comprise one or more microprocessors or digital signal processor (DSPs) that may be programmed using software or computer program code to perform the required functions and/or to control components of the control unit to effect the required functions. The control unit may be implemented as a combination of dedicated hardware to perform some functions (e.g. amplifiers, pre-amplifiers, analog-to-digital converters (ADCs) and/or digital-to-analog converters (DACs)) and a processor (e.g. one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

In various implementations, at least one of the first control unit 140 and the second control unit 240 may be associated with or comprise one or more memory units that comprise any type of memory, such as cache or system memory including volatile and non-volatile computer memory such as random access memory (RAM), static RAM (SRAM), dynamic RAM (DRAM), read-only memory (ROM), programmable ROM (PROM), erasable PROM (EPROM), and electrical erasable PROM (EEPROM). The first and/or control unit or associated memory unit can also be used for storing program code that can be executed by a processor in the respective control unit to perform the functions described herein. In some embodiments, the memory unit can store spectra of a plurality of macronutrients for comparison with a measured near-infrared light spectrum at the respective control unit.

In some embodiments, at least one of the first device 100 and the second device 200 may further comprise a user interface (not shown in the drawing). The user interface may be for use in providing a user with information associated with a relative position of the first device 100 with respect to the second device 200. The determination of this relative position will be explained in more detail with reference to FIG. 2. The first and the second control units 140, 240, may be configured to control the respective user interface to provide this information. The user interface as referred to herein may be any user interface that enables the rendering (or output or display) of data (or information) to a user of the system 10. The user interface may comprise a display unit in some embodiments.

Alternatively or in addition, a user interface as referred to herein may be any user interface that enables a user of the system 10 to provide additional user input, interact with and/or control at least one of the first device 100 and the second device 200. For example, a user interface as referred to herein can comprise one or more switches, one or more buttons, a keypad, a keyboard, a gesture recognition sensor, a touch screen or an application (for example, on a tablet or smartphone), one or more microphones or any other audio component, or any other user interface component, or a combination of user interface components.

It will be appreciated that FIG. 1 only shows the components required to illustrate an aspect of the system 10, the first device 100 and the second device 200, and in a practical implementation, the system 10, the first device 100, and/or the second device 200 may comprise alternative or additional components to those shown. For example, in some embodiments, the first device 100 may not comprise a functional component 150. As another example, the first device and the second device may each comprise a battery for powering the device.

Although it is described above that the first device 100 in this embodiment comprises first to third transmitter coils, it will be appreciated that in alternative embodiments the first device 100 may comprise a different number (more or fewer) of transmitter coils. Similarly, although it is described above that the second device 200 in this embodiment comprises first to third receiver coils, it will be appreciated that in alternative embodiments the second device 200 may comprise a different number (more or fewer) of receiver coils. The number of transmitter coils and/or receiver coils may be based on a technical requirement of the system 10 or each of the first and second devices 100, 200.

Figure 2:
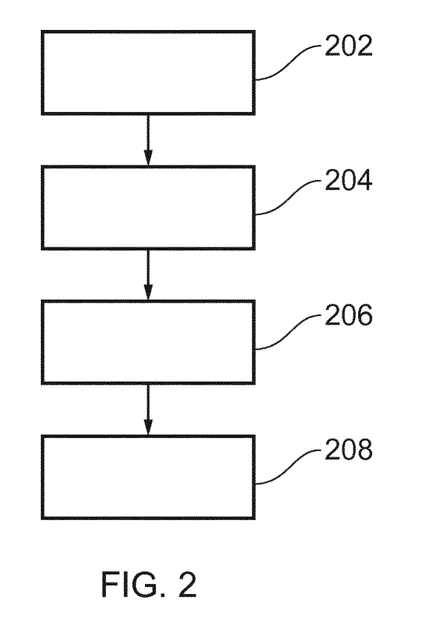
FIG. 2 illustrates a method for synchronizing the first device and the second device of FIG. 1.

FIG. 2 illustrates a method for synchronizing the first device 100 and the second device 200 of FIG. 1. The illustrated method can generally be performed by or under the control of the first control unit 140 of the first device 100 and the second control unit 240 of the second device 200. In some embodiments, blocks 202 and 204 may be performed by the first control unit 140 while blocks 206 and 208 may be performed by the second control unit 240. It will be appreciated that the method of FIG. 2 can be performed by a different system, for example a system comprising a single control unit or processor. In this case, the method of FIG. 2 may be performed by the single control unit or processor.

With reference to FIG. 2, at block 202, a synchronization signal comprising a sequence of signals is generated at the first device 100. Each of the signals in the sequence has a first frequency. Subsequently, at block 204, the sequence of signals generated at block 202 is transmitted from the first device 100 to the second device 200. In some embodiments, transmitting the sequence of signals at block 204 may comprise transmitting the synchronization signal generated at block 202 sequentially by the first transmitter coil 110, the second transmitter coil 120, and the third transmitter coil 130. In more detail, the transmitting process may comprise the steps of: transmitting, from the first transmitter coil 110, the synchronization signal to the second device 200 as a first signal in the sequence, transmitting, from the second transmitter coil 120, the synchronization signal to the second device 20 as a second signal in the sequence, and transmitting, from the third transmitter coil, the synchronization signal to the second device 200 as a third signal in the sequence. In some embodiments, the transmission of each of the signals in the sequences may be performed without interruption. Specifically, each of the signals in the sequence may be transmitted in a continuous manner from the first device 100 to the second device 200 without the transmission or reception of any other signal or any delay.

Returning to FIG. 2, at block 206, signal processing of the sequence of signals transmitted at block 204 is performed to determine relative phase information of each of the signals in the sequence. In some embodiments, signal processing of the sequence of signals may be performed by the second control unit 240 of the second device 200.

In some embodiments, performing signal processing of the sequence of signals at block 206 may comprise: generating a reference signal at the second device 200, selecting, at the second device 200, one of the first transmitter coil 110, the second transmitter coil 120, and the third transmitter coil 130, determining a phase offset associated with the selected transmitter coil, and determining, for each of the two other (unselected) transmitter coils, a phase offset. The determination of the phase offset of the selected transmitter coil may be based on the signal in the sequence transmitted by the selected transmitter coil and the generated reference signal. The determination of the phase offset of the two other transmitter coils may be based on the determined phase offset associated with the selected transmitter coil and a phase shift between the signal transmitted from the respective transmitter coil in the sequence and the generated reference signal. As will be explained in more detail with reference to block 208, in some embodiments the step of synchronizing the first device 100 and the second device 200 may be based on the phase offsets determined in the manner as described above.

In some embodiments, the determination of phase offset of the transmitter coils may be performed in a stepwise approach in which determination of the phase offset associated with a transmitter coil is performed after the second device 200 receives the signal transmitted by the respective transmitter coil and before the transmission of the next signal in the sequence. In alternative embodiments, the determination of phase offset of the transmitter coils may be performed in a continuous approach in which determination of the phase offset associated with each of the transmitter coils is performed after the second device 200 receives all the signals in the sequence.

Furthermore, in some embodiments determining the phase offset associated with each of the two other (non-selected) transmitter coils may be based on whether relative phase information of the respective signal transmitted by the transmitter coil in the sequence is closer to 0° or −180°. If the relative phase information of the respective signal is closer to 0°, the phase offset associated with the transmitter coil is set as 0°; if the relative phase information of the respective signal is closer to −180°, the phase offset associated with the transmitter coil is set as −180°.

In an example, the selected transmitter coil may be the first transmitter coil 110 of the first device 100. In this example, the phase offset for each of the second transmitter coil 120 and the third transmitter coil 130 would be determined on the basis of the phase offset that is in turn determined based on the first signal as well as the phase shift between the respective signal (i.e. second or third) and the generated reference signal. In some embodiments, the determination of the phase offset associated with the second transmitter coil 120 may be performed before the determination of the phase offset associated with the third transmitter coil 130.

In some embodiments, the reference signal may have the same frequency as the first to third signals (i.e. the first frequency as described above with reference to block 202). In alternative embodiments, the reference signal may have a frequency that is within a tolerance range from the first frequency. Moreover, in embodiments where each of the received coils at the second device 200 is configured to receive each of the signals in the sequence transmitted from the first device 100, determining a phase offset associated with a respective transmitter coil may comprise: determining the signal strength of the respective transmitted signal received at each the first receiver coil 210, the second receiver coil 220, and the third receiver coil 230; selecting one of the first receiver coil, the second receiver coil, and the third receiver coil which corresponds the largest received signal strength; and determining the phase offset associated with the respective transmitter coil based on the respective transmitter signal received at the selected receiver coil.

Returning to FIG. 2, at block 208, the first device 100 and the second device 200 are synchronized based on the relative phase information determined at block 206. Specifically, this synchronization is performed by correcting phase offset of subsequent individual signals transmitted from the first device 100 to the second device 200. In some embodiments, the method may comprise, prior to block 208, comparing a signal strength of at least one of the signals in the sequence with a predetermined threshold, and the method only proceeds to block 208 at which the synchronization of the first device 100 and the second device 200 is performed if the signal strength of at least one of the signals in the sequence is higher than the predetermined threshold. Furthermore, in some embodiments, the method may only proceed to block 208 at which the synchronization of the first device 100 and the second device 200 is performed if the signal strength of all of the signals in the sequence is higher than the predetermined threshold.

As mentioned above, in some embodiments performing signal processing of the sequence of signals at block 206 may comprise selecting one of the transmitter coils of the first device 100, determining a phase offset associated with the selected transmitter coil, and also determining, for each of the two other (non-selected) transmitter coils, a phase offset. In these embodiments, synchronizing the first device 100 and the second device 200 at block 208 may comprise synchronizing the phase difference between the first device 100 and the second device 200 based on the determined phase offsets associated with the first to third transmitter coils.

Although not illustrated in FIG. 2, the method may further comprise changing from a synchronization mode in which signal processing of the sequence of signals (i.e. block 206) is performed to a normal mode in which one or more subsequent individual signals are transmitted from the first device 100 to the second device 200 (i.e. block 208). In some embodiments, at least block 206 in the method may be considered to correspond to a step that is performed in the synchronization mode and block 208 may be considered to correspond a step that is performed in the normal mode.

In some embodiments, the change from the synchronization mode to the normal mode may be initiated automatically upon receiving the last signal in the sequence of signals transmitted from the first device 100 to the second device 200. In some embodiments, the change from the synchronization mode to the normal mode may be initiated automatically upon determination of the relative phase information each of the transmitted signals in the sequence.

Moreover, in some embodiments, the method may further comprise comparing, in the normal mode, a signal strength of at least one subsequent individual signals with a predetermined threshold, and changing from the normal mode to the synchronization mode if the signal strength of at least one of the subsequent individual signals is lower than the predetermined threshold. The predetermined threshold for the signal strength may correspond to a distance of the first device 100 from the second device 200 which places the first device 100 out of an optimal range for performing synchronization. By changing from the normal mode to the synchronization mode when the signal strength of at least one subsequent individual signals (transmitted by the first device 100) is lower than the predetermined threshold, it can be ensured that each time the first device is out of the optimal range (for example, due to system interruptions), the synchronization parameters can be reset such that an accurate synchronization can be achieved between the first device 100 and the second device 200.

As mentioned above, in some embodiments the method may further comprise changing from the synchronization mode to the normal mode. In these embodiments, the method may further comprise transmitting, in the normal mode, a position signal from each of the first transmitter coil 110, the second transmitter coil 120, and the third transmitter coil 130. The respective position signals from each of the transmitter coils 110, 120, 130 may have different frequencies. In these embodiments, synchronizing the first device 100 and the second device 200 at block 208 may comprise correcting, at the second device 200, phase offset of each of the transmitted position signals based on the determined relative phase information. The method may further comprise determining, at the second device 200, a position of the first device 100 relative to the second device 200 based on at least one of the transmitted position signals with corrected phase offsets.

In these embodiments, correcting phase offset of each of the transmitted position signals may comprise setting the phase as one of 0° and −180° based on the determined relative phase information. In more detail, in these embodiments, for each of the transmitted position signals, it may be determined by the second control unit 240 whether the phase of the position signal is closer to 0° or −180°. If it is determined that the phase is closer to of 0°, the phase of the position signal is set to 0°, and if it is determined the phase is closer to of −180°, the phase of the position signal is −180°. Since the first device 100 and the second device 200 may have different tolerances in clock frequencies, jitter and/or delay between the first device 100 and the second device 200 can occur. By correcting the phase offset as one of 0° or −180° in these embodiments, the slowly shifting phase difference caused by jitter or delay between the first device 100 and the second device 200 can be corrected.

As described above with reference to FIG. 1, in some embodiments the functional component 150 of the first device 100 may be located at a predetermined distance from the first transmitter coil 110, the second transmitter coil 120, and the third transmitter coil 130. In these embodiments, determining a position of the first device 100 relative to the second device 200 may comprise: performing signal processing of the position signals (from the first transmitter coil 110, the second transmitter coil 120, and the third transmitter coil 130) to obtain a first position and a second position, wherein one of the first position and the second position corresponds to a hemisphere in which the functional component 150 is located with respect to the first to third transmitter coils 110, 120, 130, determining which of the first position and the second position corresponds to the hemisphere in which the function component 150 is located based on the predetermined distance between the functional component 150 and the first to third transmitter coils 110, 120, 130, and selecting the position that corresponds to the hemisphere in which the functional component is located as the correct position of the first device 100 relative to the second device 200. Examples of the hemispheres as mentioned are illustrated FIG. 5A and FIG. 5B and will be explained more detail below with reference to these drawings.

Although not illustrated in FIG. 2, the method may further comprise transmitting a notification from the second device 200 to the first device 100 upon receiving each of the first signal, the second signal, and the third signal. In this way, once the first device 100 receives the notification from the second device 200 that the first signal has been transmitted, the first control unit 140 of the first device 100 can control switching from the first transmitter coil 110 to the second transmitter coil 120 such that the synchronization signal can be transmitted by the second transmitter coil 120 as the second signal. Similarly, once the first device 100 receives the notification from the second device 200 that the second signal has been transmitted, the first control unit 140 of the first device can control switching from the second transmitter coil 120 to the third transmitter coil 130 such that the synchronization signal can be transmitted by the third transmitter coil 130 as the third signal.

Figure 3:
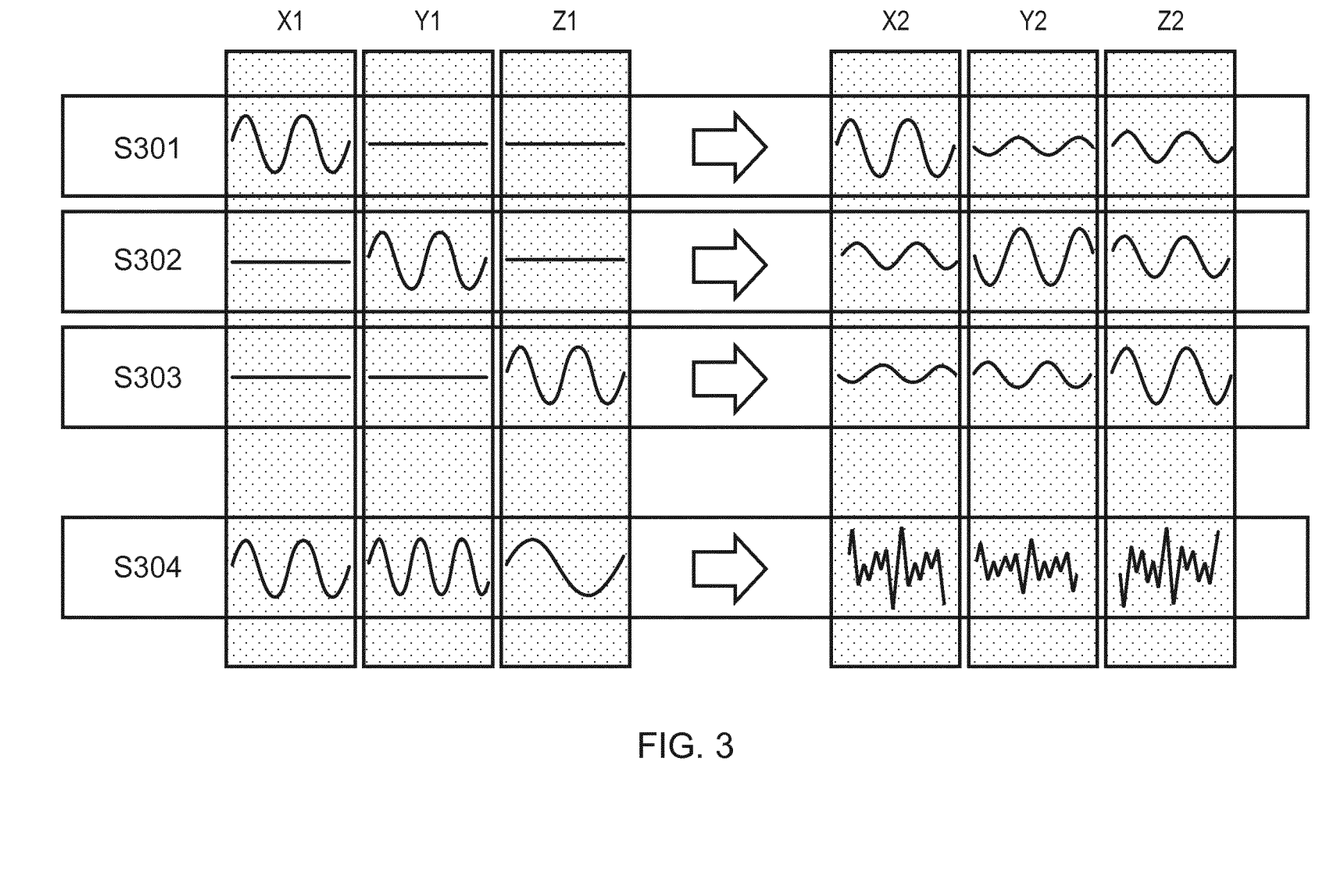
FIG. 3 is a diagram illustrating the signals transmitted from each of the transmitter coils of the first device of FIG. 1 and the signals received at each of the receiver coils of the second device of FIG. 1 during the synchronization mode and during the normal mode.

FIG. 3 is a diagram illustrating the signals transmitted from each of the transmitter coils of the first device 100 of FIG. 1 and the signals received at each of the receiver coils of the second device 200 of FIG. 1 during the synchronization mode and during the normal mode.

Each of the columns X1, Y1, Z1, X2, Y2, Z2 corresponds to a transmitter coil at the first device 100 or a receiver coil at the second device 200. In the present embodiment, each of the transmitter coils and the receiver coils correspond to a coordinate axis in a three-dimensional Cartesian coordinate system and therefore each of these transmitter/receiver coils is labelled accordingly in the diagram. Specifically, X1 corresponds to the first transmitter coil 110 (x-axis), Y1 corresponds to the second transmitter coil 120 (y-axis), Z1 corresponds to the third transmitter coil 130 (z-axis), X2 corresponds to the first receiver coil 210 (x-axis), Y2 corresponds to the second receiver coil (y-axis), and Z2 corresponds to the third receiver coil 230 (z-axis).

As shown in FIG. 3, the diagram includes four distinctive steps: S301, S302, S303, and S304. Steps S301, S302, and S303 respectively correspond to the transmission of the synchronization signal from the first device 100 to the second device 200 by the first transmitter coil 110, the second transmitter coil 120, and the third transmitter coil 130. Furthermore, step 304 corresponds to the transmission of a position signal from the first device 100 to the second device 200 by the first transmitter coil 110, the second transmitter coil 120, and the third transmitter coil 130. In the present embodiment, steps S301 to S303 are performed in the synchronization mode while step S304 is performed in the normal mode.

At step S301, a synchronization signal generated at the first device 100 is transmitted by the first transmitter coil 110, as a first signal in the sequence, and received by each of the first receiver coil 210, second receiver coil 220, and third receiver coil 230. This is represented by a waveform in each of the columns X1, X2, Y2, and Z2, with the signal received at the first receiver coil 210 having the same phase (denoted by "+" sign in the X2 column) and amplitude as the signal transmitted by the first transmitter coil 110.

At step S302, the synchronization signal generated at the first device 100 is transmitted by the second transmitter coil 120, as a second signal in the sequence, and received by each of the first receiver coil 210, second receiver coil 220, and third receiver coil 230. This is represented by a waveform in each of the columns Y1, X2, Y2, and Z2, with the signal received at the second receiver coil 220 having the same amplitude as the signal transmitted by the second transmitter coil 120 but an inverted phase (denoted by "−" sign in the Y2 column).

At step S303, the synchronization signal generated at the first device 100 is transmitted by the third transmitter coil 130, as a third signal in the sequence, and received by each of the first receiver coil 210, second receiver coil 220, and third receiver coil 230. This is represented by a waveform in each of the columns Z1, X2, Y2, and Z2, with the signal received third receiver coil 230 having the same phase (denoted by "+" sign in the Z2 column) and amplitude as the signal transmitted by the third transmitter coil 130.

At step S304, a position signal is transmitted from each of the first transmitter coil 110, second transmitter coil 120, and third transmitter coil 130 and received by each of the first receiver coil 210, second receiver coil 220, and third receiver coil 230. This is represented by a waveform in each of the columns X1, Y1, Z1, X2, Y2, and Z2. Each of the signals received at receiver coils 210, 220, 230 is a combination of the signals transmitted by the first transmitter coil 110, second transmitter coil 120, and third transmitter coil 130. The transmission of the position signals from the first device 100 to the second device 200 will be explained in more detail below with reference to FIG. 4.

Although not explicitly illustrated in FIG. 3, after each of steps S301 to S303, relative phase information of the transmitted signal is determined, and after step S304, phase offset of the transmitted position signal may be corrected based on the determined phase information. Specifically, in some embodiments, the method may further include performing signal processing of the sequence of signals by determining phase offsets associated with each of the transmitter coils 110, 120, 130 of the first device 100. In this case, the phase difference between first device 100 and the second device 200 may be synchronized based on the determined offsets after performing steps S301 to S303 illustrated in FIG. 3. Hence, once the position signal is received at the second device 200 at step S304, phase offset of the transmitted position signals may be corrected on the basis of the phase offsets determined for each of the transmitter coils 110, 120, 130 so as to allow an accurate determination of a relative position of the first device 100 with respect to the second device 200.

Figure 4:
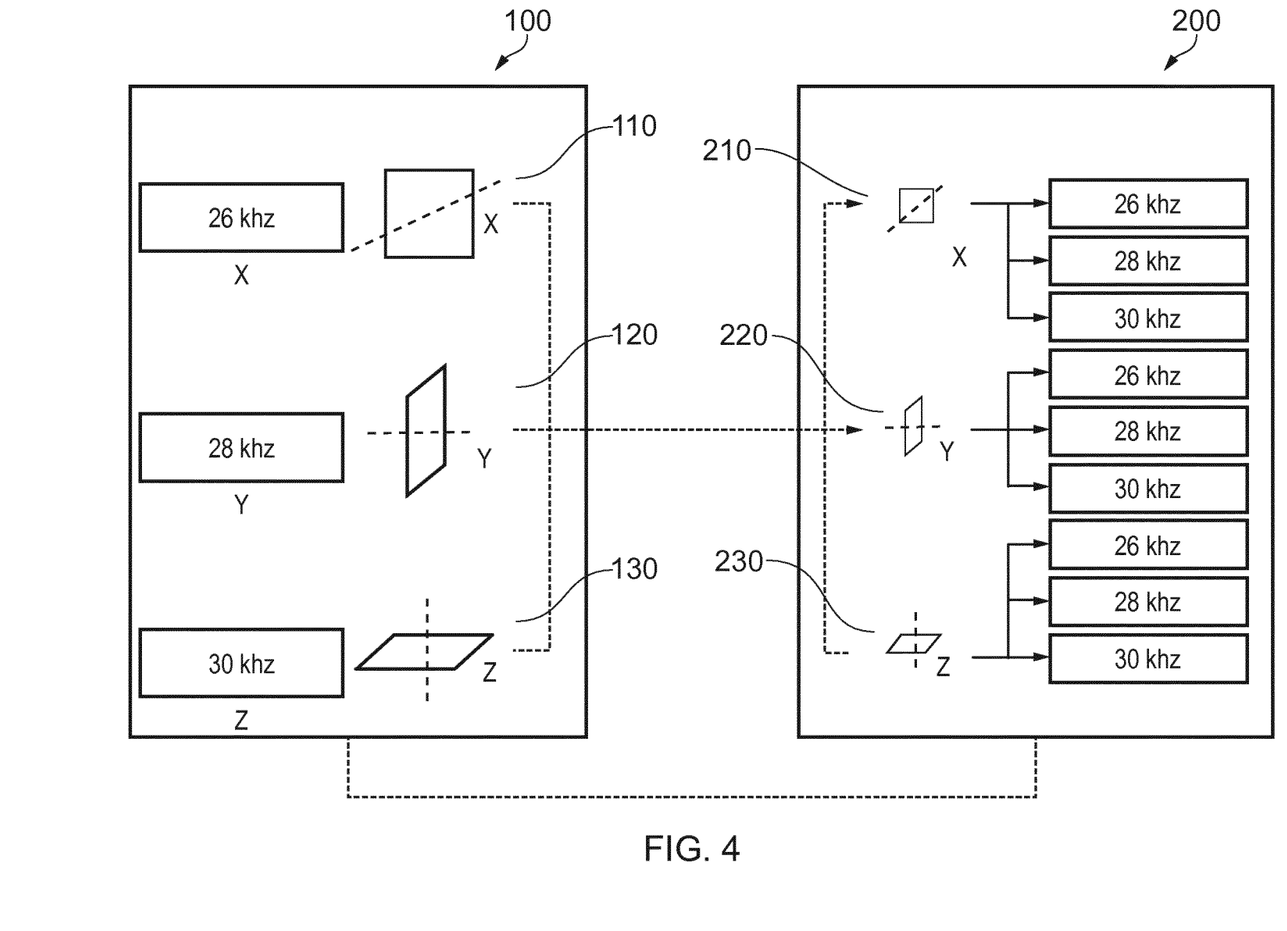
FIG. 4 is a diagram illustrating transmission of position signals between the transmitter coils of the first device and the receiver coils of the second device of FIG. 1 during the normal mode.

FIG. 4 is a diagram illustrating transmission of position signals between the transmitter coils of the first device 100 and the receiver coils of the second device 200 of FIG. 1 during the normal mode.

The position signal transmitted by each of the first transmitter coil 110, the second transmitter coil 120, and the third transmitter coil 130 of the first device 100 respectively corresponds to the three coordinate axes in the three-dimensional Cartesian coordinate system. Therefore, as shown in FIG. 4, each of the position signals transmitted by a transmitter coil is represented by a schematic demonstrating an axis in the Cartesian coordinate system. In more detail, the position signal transmitted by the first transmitter coil 110 is represented an x-axis schematic together with the label "X", the position signal transmitted by the second transmitter coil 120 is presented by a y-axis schematic with the label "Y", and the position signal transmitted by the third transmitter coil 130 is represented by a z-axis schematic with the label "Z". In the normal mode, the position signal transmitted by each of the transmitter coils 110, 120, 130 has a different frequency. In the present embodiment, the position signal transmitted by the first transmitter coil 110 has a frequency of 26 kHz, the position signal transmitted by the second transmitter coil 120 has a frequency of 28 kHz, and the position signal transmitted by the third transmitter coil 130 has a frequency of 30 kHz. Nevertheless, it will be appreciated that in other embodiments the frequencies of each of the position signals transmitted by the respective transmitter coils may adopt other different values.

Similar to the transmitter coils 110, 120, 130, each of the receiver coils 210, 220, 230 at the second device 200 is also represented by a schematic corresponding to a respective axis of the three-dimensional Cartesian coordinate system. As shown in FIG. 4, the first receiver coil 210 is represented by an x-axis schematic with the label "X", the second receiver coil 220 is represented by a y-axis schematic with the label "Y", and the third receiver coil 230 is represented by a z-axis schematic with the label "Z". It is further illustrated in the diagram of FIG. 4 that the signal received at each of the first receiver coil 210, second receiver coil 220, and third receiver coil 230 comprises a combination of the signals from the first to third transmitter coils 110, 120, 130. In other words, the signal received at each of the receiver coils 210, 220, 230 comprises signal at frequencies 26 kHz, 28 kHz, and 30 kHz.

As described above in the method illustrated in FIG. 2, once the signals are received at the second device 200, phase offset of each of the transmitted position signals can be corrected based on relative phase information that is determined in the synchronization mode. Hence, a position of the first device 100 relative to the second device 200 can be determined based on at least one of the transmitted position signals with corrected phase offsets.

FIG. 5A and FIG. 5B respectively illustrate a relevant hemisphere in which the functional component is located with respect to the transmitter coils of the first device 100 of FIG. 1 and an irrelevant hemisphere.

As described above with reference to FIG. 1 and FIG. 2, in some embodiments the first device 100 comprises a functional component 150 that is confirmed to perform a specific function of the first device 100. In the embodiment shown in FIG. 5A and FIG. 5B, the first device 100 is a hair clipper and the functional component 150 is a cutting unit provided at the hair clipper. The functional component 150 is located at a predetermined distance from the transmitter coils of the first device, which is represented by a transmitter unit 160 as labelled in the drawings.

Also, as described above with reference to FIG. 2, signal processing of the position signals received the second device can be performed so as to obtain a first position and a second position, one of which corresponding to a correct relative position of the first device 100 with respect to the second device 200. This is because the transmitter coils of the first device 100 are configured to generate symmetric three-dimensional magnetic fields, and due to this symmetry, signal processing of the position signals received at the receiver coils at the second device 200 would always generate two solutions, each corresponding to a hemisphere of the three-dimensional magnetic field. Hence, one of the first position and the second position obtained as a result of the signal processing would correspond to a relevant hemisphere in which the functional component 150 is located with respect to the first to third transmitter coils 110, 120, 130 (i.e. correct phase), while the other one would correspond to an irrelevant hemisphere. These are respectively illustrated in FIG. 5A and FIG. 5B. In more detail, the position (labelled 512) belonging in the relevant hemisphere 510 shown in FIG. 5A would allow the first device 100 to be operated correctly (as the detected position corresponds a certain point at or near the head 500 of the user), while the position (labelled 522) belonging in the irrelevant hemisphere 520 as shown in FIG. 5B would prevent the first device 100 from being operated correctly (since the position 522 does not correspond to a point at or near the head 500 of the user).

Therefore, as described above, the method according some embodiments may further comprise determining which of the first position and the second position corresponds to the hemisphere in which the function component 150 is located, the determination being based on the predetermined distance between the functional component 150 and the first to third transmitter coils 110, 120, 130. The position that corresponds to the hemisphere in which the functional component 150 is located can then be selected as the correct position of the first device 100 relative to the second device 200.

By using the above-described technique to determine the position that corresponds to the hemisphere in which the functional component 150 is located, the need for performing user-assisted calibration for the first device 100 and the second device 200 can be eliminated. Therefore, a more user-friendly and intuitive system can be provided while preventing potential errors caused by improper handling by users.

There is thus provided an improved method for synchronizing a first device and a second device, and an improved system comprising a first device and a second device, the two devices being configured to synchronize with each other.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for synchronizing a first device and a second device, the first device and the second device being connectable via a wireless link, wherein the first device comprises a first transmitter coil, a second transmitter coil, and a third transmitter coil, the method comprising:
    generating, at the first device, a synchronization signal comprising a sequence of signals, wherein each of the signals in the sequence has a first frequency;
    transmitting the sequence of signals from the first device to the second device wherein transmitting of signals from the first device to the second device comprises:
    transmitting, from the first transmitter coil, the synchronization signal to the second device as a first signal in the sequence;
    transmitting, from the second transmitter coil, the synchronization signal to the second device as a second signal in the sequence; and
    transmitting, from the third transmitter coil, the synchronization signal to the second device as a third signal in the sequence;
    performing, at the second device, signal processing of the sequence of signals to determine relative phase information of each of the signals in the sequence wherein performing signal processing of the sequence of signals comprises:
    generating a reference signal at the second device;
    selecting one of the first transmitter coil, the second transmitter coil, and the third transmitter coil of the first device;
    determining a phase offset associated with the selected transmitter coil based on the signal in the sequence transmitted by the selected transmitter coil and the generated reference signal; and
    determining, for each of the two other transmitter coils, a phase offset associated with the transmitter coil, wherein determination of the phase offset is based on: the determined phase offset associated with the selected transmitter coil and a phase shift between the signal transmitted from the respective transmitter coil in the sequence and the generated reference signal; and
    synchronizing, based on the determined relative phase information, the first device and the second device by correcting phase offset of subsequent individual signals transmitted from the first device to the second device wherein synchronizing the first device and the second device comprises:
    synchronizing the phase difference between the first device and the second device based on the determined phase offsets associated with the first to third transmitted coils.

2. The method according to claim 1, further comprising changing from a synchronization mode in which signal processing of the sequence of signals is performed to a normal mode in which one or more subsequent individual signals are transmitted from the first device to the second device.

3. The method according to claim 2, further comprising comparing, in the normal mode, a signal strength of the at least one subsequent individual signals with a predetermined threshold, and changing from the normal mode to the synchronization mode if the signal strength of at least one of the subsequent individual signals is lower than the predetermined threshold.

4. The method according to claim 2, further comprising:
    transmitting, in the normal mode, a position signal from each of the first transmitter coil, the second transmitter coil, and the third transmitter coil, wherein the respective position signals from each of the transmitter coils have different frequencies, and
    wherein synchronizing the first device and the second device comprises correcting, at the second device, phase offset of each of the transmitted position signals based on the determined relative phase information,
    wherein the method further comprises determining, at the second device, a position of the first device relative to the second device based on at least one of the transmitted position signals with corrected phase offsets.

5. The method according to claim 4, wherein correcting phase offset of each of the transmitted position signals comprises determining the phase offset as one of 0° and −180° based on the determined relative phase information.

6. The method according to claim 4, wherein the first device further comprises a functional component located at a predetermined distance from the first to third transmitter coils, wherein determining a position of the first device relative to the second device further comprises:
    performing signal processing of the position signals to obtain a first position and a second position, wherein one of the first position and the second position corresponds to a hemisphere in which the functional component is located with respect to the first to third transmitter coils;
    determining which of the first position and the second position corresponds to the hemisphere in which the functional component is located based on the predetermined distance between the functional component and the first to third transmitter coils; and selecting the position that corresponds to the hemisphere in which the functional component is located as the correct position of the first device relative to the second device.

7. The method according to claim 6, wherein the selected transmitter coil is the first transmitter coil, and determining the phase offset for the second transmitter coil is performed before determining the phase offset for the third transmitter coil.

8. The method according to claim 7, wherein the second device comprises a first receiver coil, a second receiver coil, and a third receiver coil, each of the first to third receiver coils being configured to receive each of the signals in the sequence transmitted from the first device, and wherein determining a phase offset associated with a respective transmitter coil comprises:
  determining the signal strength of the respective transmitted signal received at each the first receiver coil, the second receiver coil, and the third receiver coil;
  selecting one of the first receiver coil, the second receiver coil, and the third receiver coil which corresponds the largest received signal strength; and
  determining the phase offset associated with the respective transmitter coil based on the respective transmitter signal received at the selected receiver coil.

9. The method according to claim 1, further comprising transmitting a notification from the second device to the first device upon receiving each of the first signal, the second signal, and the third signal.

10. The method according to claim 1, further comprising comparing a signal strength of at least one of the signals in the sequence with a predetermined threshold, wherein the step of synchronizing the first device and the second device is only performed if the signal strength of at least one of the signals in the sequence is higher than the predetermined threshold.

11. A system comprising a first device and a second device, the first device and the second device being connectable via a wireless link,
  wherein the first device comprises a first transmitter coil, a second transmitter coil, and a third transmitter coil,
  wherein the first device comprises a first control unit configured to:
    generate a synchronization signal comprising a sequence of signals, wherein each of the signals in the sequence has a first frequency; and
    transmit the sequence of signals to the second device,
  wherein transmitting of signals from the first device to the second device comprises:
    transmitting, from the first transmitter coil, the synchronization signal to the second device as a first signal in the sequence;
    transmitting, from the second transmitter coil, the synchronization signal to the second device as a second signal in the sequence; and
    transmitting, from the third transmitter coil, the synchronization signal to the second device as a third signal in the sequence, and
  wherein the second device comprises a second control unit configured to:
    perform signal processing of the sequence of signals to determine relative phase information of each of the signals in the sequence
  wherein performing signal processing of the sequence of signals comprises:
    generating a reference signal at the second device;
    selecting one of the first transmitter coil, the second transmitter coil, and the third transmitter coil of the first device;
    determining a phase offset associated with the selected transmitter coil based on the signal in the sequence transmitted by the selected transmitter coil and the generated reference signal; and
    determining, for each of the two other transmitter coils, a phase offset associated with the transmitter coil, wherein determination of the phase offset is based on: the determined phase offset associated with the selected transmitter coil and a phase shift between the signal transmitted from the respective transmitter coil in the sequence and the generated reference signal; and
    synchronize, based on the determined relative phase information, the first device and the second device by correcting phase offset of subsequent individual signals transmitted from the first device,
  wherein synchronizing the first device and the second device comprises:
    synchronizing the phase difference between the first device and the second device based on the determined phase offsets associated with the first to third transmitted coils.

12. The system according to claim 11, wherein the second device comprises a first receiver coil, a second receiver coil, and a third receiver coil, and wherein each of the first to third receiver coils is configured to receive each of the signals in the sequence transmitted from the first device.

13. The system according to claim 11, wherein the first device is a personal care device and the second device is a sensor device, and wherein the sensor device is configured to be placed at a predetermined location with respect to a user.

* * * * *